(No Model.) 2 Sheets—Sheet 1.
D. R. BROWN.
SELF BINDING HARVESTER.
No. 412,459. Patented Oct. 8, 1889.
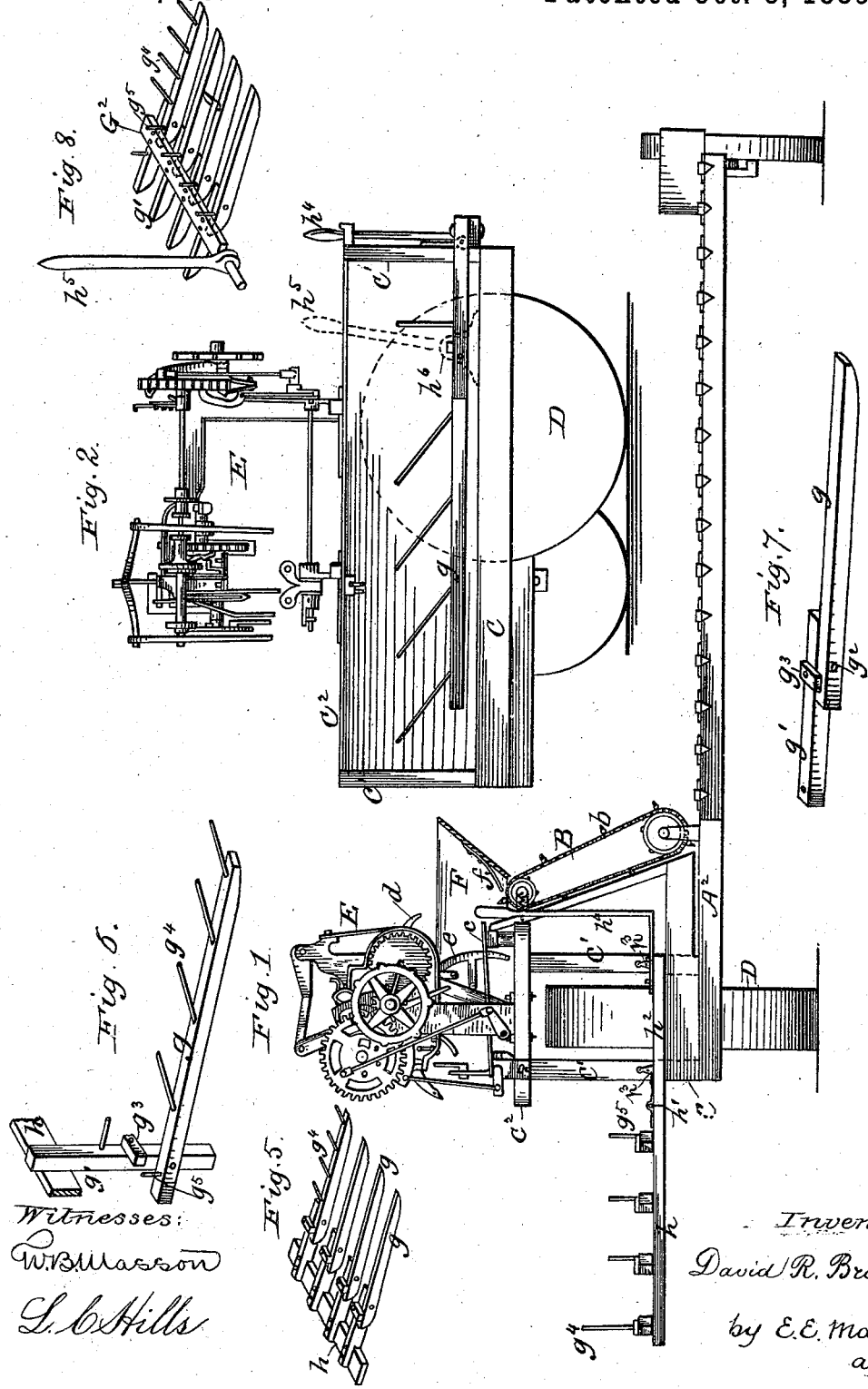
Witnesses:
W. B. Masson
L. C. Hills
Inventor
David R. Brown
by E. E. Masson
atty.

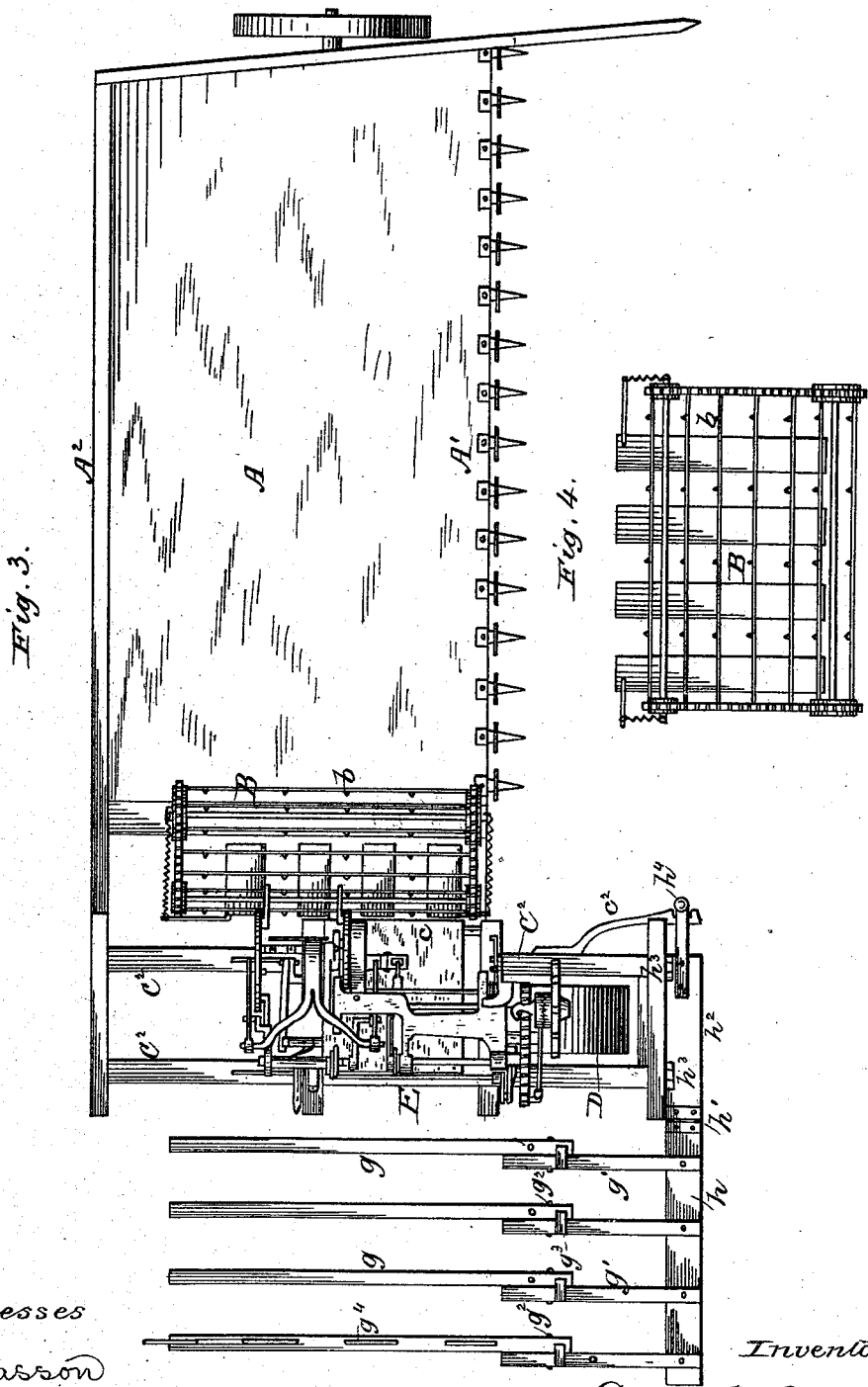

UNITED STATES PATENT OFFICE.

DAVID R. BROWN, OF ST. LOUIS, MISSOURI, ASSIGNOR TO THE WALTER A. WOOD MOWING AND REAPING MACHINE COMPANY, OF HOOSICK FALLS, NEW YORK.

SELF-BINDING HARVESTER.

SPECIFICATION forming part of Letters Patent No. 412,459, dated October 8, 1889.

Application filed April 6, 1883. Serial No. 90,797. (No model.)

*To all whom it may concern:*

Be it known that I, DAVID R. BROWN, a citizen of the United States, residing at St. Louis, in the State of Missouri, have invented certain new and useful Improvements in Self-Binding Harvesters, of which the following is a specification.

My invention relates to harvesters carrying an automatic grain-binding attachment and means for carrying and discharging together a number of grain bundles; and the objects of my improvements are, first, to provide a grain-binding harvester having the whole of its grain-binding apparatus located immediately over the main drive-wheel upon a rectangular frame resting on the axle-bearings thereof; second, to provide an automatic grain-binding harvester with means for carrying a number of grain bundles upon a slatted platform or dropper and discharging them therefrom by lowering the heads and at the same time pushing off the butts of said grain bundles.

Heretofore the grain-binding mechanism of harvesters has most commonly been placed on the outside of the frame and its drive-wheel. The objection to this location is that when riding on side hills its weight often overbalances the cutter-bar and platform, and the machine is upset and damaged. In other machines the grain-binding apparatus is located between the grain-receiving platform and the drive-wheel, requiring said platform to be at least two feet longer than necessary for the reception of the swath of grain cut by the knives, and thus adding also to the side draft of the machine. In some machines attempts have been made to locate a portion of the grain-binding mechanism above the drive-wheel, but only succeeded to a limited extent. Harvesters have also been provided with slatted droppers to deposit gavels in their wake, and the slats of said droppers have been either rigid or been hinged, so as to become bent downward in the middle of their length; but they differ from mine in construction, and the objects of my invention are to overcome their defects. I attain these objects by the construction illustrated in the accompanying drawings, in which—

Figure 1 is a front view of a grain-binding harvester constructed according to my invention. Fig. 2 is a side view of the same. Fig. 3 is a top view of the same with the open-top grain-receiver removed. Fig. 4 is a front view of the elevating-apron. Fig. 5 is a perspective view of the bundle-delivery platform or slatted bundle-dropper detached from the machine. Fig. 6 is a perspective view of the outer slat of the dropper. Fig. 7 is a perspective view of one of the inner slats. Fig. 8 represents a modification of a bundle-carrier having its slats hinged, as in Fig. 5, but its operating-lever connected with said slats nearer the hinge uniting one series of the slats to the other.

Similar letters refer to similar parts throughout the several views.

The grain-platform A, in the rear of the finger-bar A', may be of any suitable construction and provided with rakes to bring the grain to the elevating-apron B. The timbers forming the frame $A^2$ of the platform A are secured at one end to the parallel beams C, and between the latter is located the main drive-wheel D. The axle-boxes of said wheel are connected with the beams C, so as to be in line with the cutting apparatus to produce a fore-and-aft well-balanced machine, and thereby reduce the jerking of the tongue against the horses drawing the same. Upon the top of the beams C are secured the standards C' C', having their upper ends projecting slightly above the top of the drive-wheel, and upon said ends is secured the rectangular frame or platform $C^2$ $C^2$, and centrally upon said platform the grain-binding mechanism E is bolted. This binding mechanism does not contain any novel feature of my invention, and will therefore not require any detailed description of its parts. It represents the well-known "Holmes Binder;" but any other suitable binder may be used if its construction permits it to be located centrally over and in a plane passing through the center of the drive-wheel.

The grain elevated by the apron B is received in a receptacle or hopper F, projecting over the elevator. The bottom of this hopper is slotted transversely and provided with fingers $f$, to support the grain, while the rake-teeth $b$ of the elevating-apron pass through said bottom. The top of the receptacle F is kept open, so that its contents are under the eye of the driver, and the feeding of the grain to the binding mechanism can be intelligently regulated and the choking thereof be prevented. A portion of the grain accumulating in the hopper is taken by the packer-fingers $d$ and by the needle-arm $e$ each time it oscillates. It is then advanced upon the binding-platform $c$ and bound into a bundle. It is then discharged in the usual manner over the side of the machine.

To prevent each bundle falling separately upon the ground, and to carry a sufficient number of them (say about eight) to a point where they are to be shocked, forms the second part of my invention. This consists of a bundle-carrier made of a series of slats $g$ and $g'$, pivoted together in pairs at $g^2$ near their adjoining ends in such a way that the two will remain rigid and in line, even if a weight is placed upon their edge, but are also capable of being folded together, the slats $g'$ being much shorter than the slats $g$. The bundle-carrier can be pivoted at either one of two different points of its length to the sides of the machine, so as to be operated either by the driver's right hand, as arranged in Fig. 8, or by his left hand, as in Fig. 1 or 5, (or either one of his feet,) the seat for said driver occupying, preferably, a position upon the front of the platform $C^2$. In either case the folding of the bundle-carrier and discharging of the load of bundles are accomplished by similar motions of the driver.

In nearly all the figures except Fig. 8 I have shown the bundle-carrier operated by a lever on the left-hand side of the driver, and will first describe this mode of hinging the carrier to the frame and operating it. In this case the outer end of each slat $g'$ is rigidly secured to the arm $h$, and to allow the bundle-carrier to be folded upward against the side of the machine for transportation and passage through narrow gates this arm $h$ is hinged at $h'$ to its inner end $h^2$, and this portion $h^2$ is hinged at $h^3$ to the frame or posts C' C' of the machine. Upon the end $h^2$ is mounted a hand-lever $h^4$, having its upper end within easy reach of the driver's left hand. This lever is made sufficiently springy or provided with a spring-latch to engage with a notch of a curved arm or surface $c^2$, secured to the frame $C^2$. As long as the lever is in engagement with the arm $c^2$ the slats $g$ and $g'$ of the bundle-receiver remain in line, and the whole series are thus retained parallel with the side of the machine, as shown in Fig. 2. When the hand-lever $h^4$ is released from engagement with the arm $c^2$ and swung rearwardly, (the weight of the bundle upon the receiver causing it to automatically swing rearwardly,) the rear end of the slats $g$ first falls upon the ground, giving to the receiver a decided angle with the horizon, and generally causing the grain bundles to start toward the ground, when the lever $h$ is still more depressed and the slats assume the position shown in Fig. 6, and the machine in advancing leaves the bundles upon the ground and the bundle-receiver free to be locked again in a horizontal position by the driver. The raising up of the carrier, and also the unlocking and releasing thereof, may be also done automatically by a system of levers and tripping devices connected with the mechanism of the machine. To prevent the outer end of the slats $g$ from dropping before the proper time, their inner ends are made to abut under stops $g^3$, secured to the top of the front slats $g'$. The stops $g^3$ may also be connected or be formed of one piece, as shown at $G^2$ in Fig. 8, and this piece $G^2$ can be pivotally secured to the frame and used in place of the arm $h$ shown in the other figures, and be operated by the driver's right hand by means of the levers $h^5$, pivoted in a socket $h^6$, secured to the frame, as shown by dotted lines in Fig. 2. The socket $h^6$ can also be hinged to the frame, so as to allow the bundle-carrier to be folded alongside of the end of the machine. The outer slat $g$ of the receiver carries a series of rearwardly-inclined pins $g^4$ to prevent the grain bundles from rolling off, and each slat $g$ may also have a pin $g^5$ projecting upward from the inner end thereof to help retain the bundles upon the slats. When the driver tips the slats $g'$, the tips of these pins disappear below the level of the surface of said slats $g'$, and are thus withdrawn from the bundles, permitting their free discharge. This bundle-carrier can also be used with a rear-delivery grain-binder by changing its location and points of attachment to the frame and connecting its operating-lever by suitable rods and cranks with a hand or foot lever within reach of the driver.

By locating the grain-binding mechanism upon a rectangular frame immediately over the drive-wheel and folding the bundle-carrier the length of the machine is so reduced that a six-feet-and-a-half-cut machine can easily pass through a ten-foot gate. The weight of the machine is for the same reason also reduced to a minimum, while also at the same time the whole weight of the binding mechanism is directly over both axle-bearings of the drive-wheel, where it is most needed and is also best balanced.

Having now fully described my invention, what I claim, and desire to secure by Letters Patent, is—

The combination of a harvester-frame having a grain-binding mechanism mounted thereupon, a notched arm $c^2$ secured thereto, and a bundle-carrier-supporting arm also hinged to said frame and carrying a series of slats having other slats hinged to these slats secured to the hinged carrier-supporting arm, and a hand-lever adapted to engage with the notched arm on the harvester-frame, substantially as and for the purpose described.

In testimony whereof I affix my signature in presence of two witnesses.

DAVID R. BROWN.

Witnesses:
 HOSMER TUTTLE,
 E. E. MASSON.